(12) United States Patent
Swanson

(10) Patent No.: US 6,299,392 B1
(45) Date of Patent: Oct. 9, 2001

(54) MOUNTING FIXTURE FOR A MODULAR ASSEMBLY MACHINE

(75) Inventor: Douglas L. Swanson, McKean, PA (US)

(73) Assignee: Swanson Systems, Inc., Erie, PA (US)

( * ) Notice: Subject to any disclaimer, the term of this patent is extended or adjusted under 35 U.S.C. 154(b) by 0 days.

(21) Appl. No.: 09/309,162

(22) Filed: May 10, 1999

(51) Int. Cl.⁷ .............................. B23Q 37/00; B23Q 3/02
(52) U.S. Cl. .................... 408/234; 269/309; 409/219; 409/241
(58) Field of Search ................... 408/230, 234, 408/235, 241; 198/860.1, 860.2, 861.1, 735.2; 269/99, 91–94, 100, 309, 900; 409/219, 230, 241

(56) References Cited

U.S. PATENT DOCUMENTS

| | | | |
|---|---|---|---|
| 154,506 | * 8/1874 | Metcalf et al. | 408/234 |
| 1,033,758 | * 7/1912 | Howell | 269/93 |
| 1,316,141 | * 9/1919 | Cleveland | 408/234 |
| 1,316,142 | * 9/1919 | Cleveland | 408/234 |
| 2,052,600 | * 9/1936 | Boss | 142/1 |
| 3,039,597 | 6/1962 | Merchant | 198/208 |
| 3,065,530 | 11/1962 | Merchant et al. | 29/428 |
| 3,143,792 | 8/1964 | Swanson et al. | 29/208 |
| 3,231,968 | 2/1966 | Swanson | 29/208 |
| 3,712,606 | * 1/1973 | Cole | 269/92 |
| 4,186,916 | * 2/1980 | Varga | 269/303 |
| 4,196,897 | * 4/1980 | Gordon | 269/99 |
| 4,404,505 | 9/1983 | Swanson et al. | 318/561 |
| 4,445,678 | * 5/1984 | George | 269/900 |
| 4,504,096 | * 3/1985 | Roch | 408/234 |
| 4,566,169 | * 1/1986 | Vesely | 408/234 |
| 4,856,305 | * 8/1989 | Adams | 70/58 |
| 5,022,909 | 6/1991 | Swanson | 65/278 |
| 5,056,766 | * 10/1991 | Engibarov | 269/136 |
| 5,125,140 | 6/1992 | Sticht | 29/33 P |
| 5,161,926 | * 11/1992 | Schulz | 408/234 |
| 5,186,314 | 2/1993 | Clopton | 198/860.2 |
| 5,234,205 | * 8/1993 | Shanley | 269/99 |
| 5,361,894 | 11/1994 | Solcz | 198/860.1 |
| 5,501,437 | * 3/1996 | Kisslig | 269/99 |
| 5,904,242 | * 5/1999 | Swanson | 198/860.2 |

* cited by examiner

Primary Examiner—Steven C. Bishop
(74) Attorney, Agent, or Firm—Brinks Hofer Gilson & Lione

(57) ABSTRACT

A mounting fixture for a reconfigurable assembly machine having a plurality of modules with slots formed in their upper surfaces includes a square or rectangular solid block having a plurality of threaded openings. The openings receive fasteners adapted to secure various and diverse assembly machine components and devices to the mounting fixture. One surface of the block includes a channel or keyway having a width equal to the width of the throat of the slots formed in the upper surface of the assembly machine module. A locating key is received in the keyway in the block and the throat of the T-slot. The locating key includes through openings which receive threaded fasteners having heads held captive and the T-slot which, with suitable nuts, secure the block to the upper surface of the module.

20 Claims, 4 Drawing Sheets

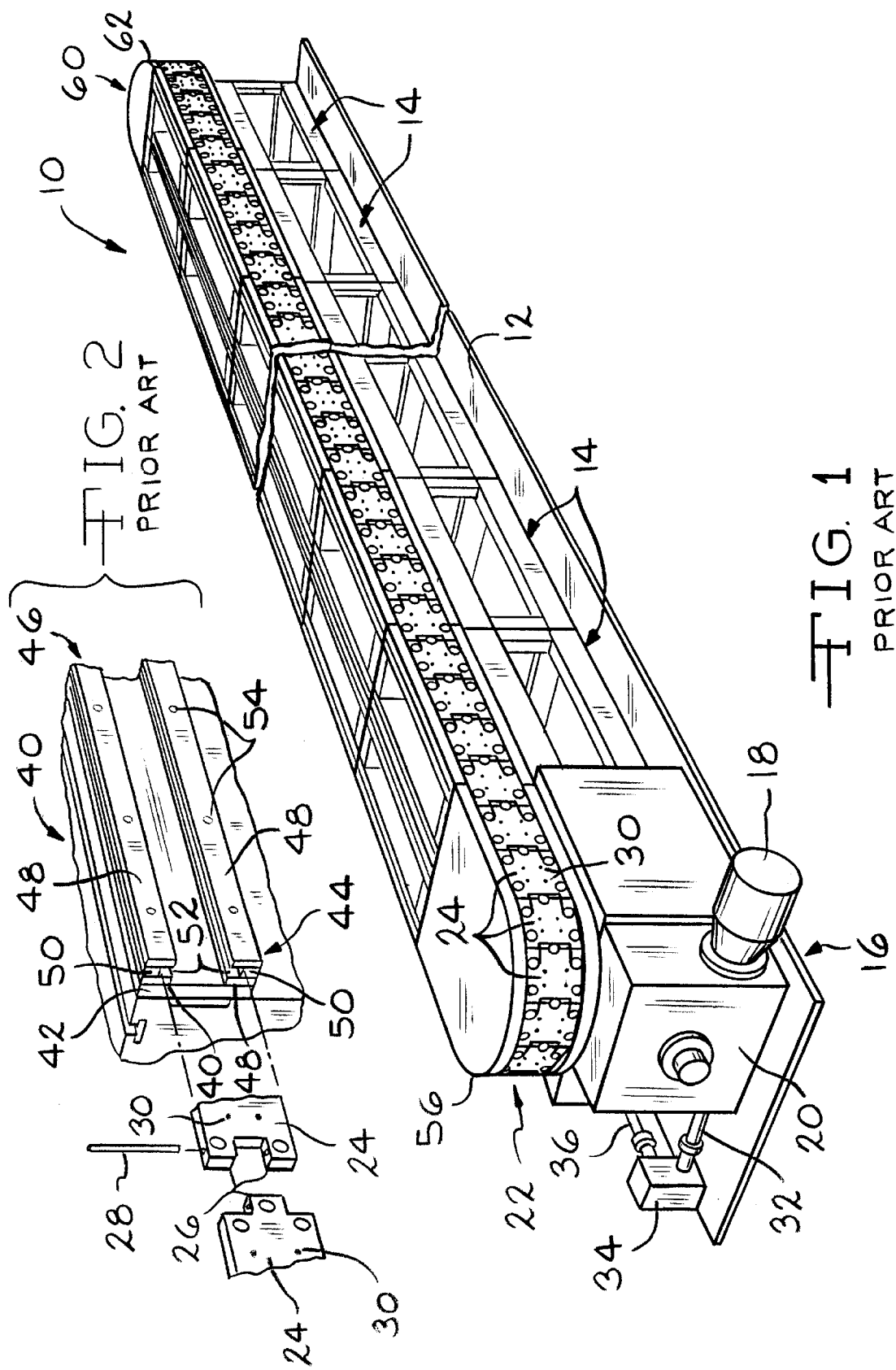

MOUNTING FIXTURE FOR A MODULAR ASSEMBLY MACHINE

BACKGROUND OF THE INVENTION

The invention relates generally to assembly machines and more specifically to a mounting fixture for an assembly machine including a mounting block defining a keyway, a key and threaded fasteners.

Automated assembly machines may be categorized according to the fundamental physical layout of the machine that is, whether it is rotary or linear. In a typical linear machine, a recirculating belt or chain carries a plurality of product fixtures sequentially and linearly along a plurality of adjacent, stationary work stations. In a rotary machine, the product fixtures are disposed upon a circular, typically horizontal, plate which rotates about a center, vertical axis and presents the fixtures to a plurality of stationary work stations. Numerous considerations such as the number of work stations, the number of product fixtures, the ratio between these two numbers, work station cycle times and other factors influence the decision to select one or the other of these types of machines to fabricate a given product.

Linear or straight line machines are illustrated in commonly owned U.S. Pat. Nos. 3,039,597 and 4,404,505. A rotary assembly machine is disclosed in commonly owned U.S. Pat. No. 3,143,792.

While these machines provide exceptional control of the manufacturing process by virtue of their repeatability and operating tolerances, one difficulty shared by such machines, which is an outgrowth of their basic construction, is their dedication to a given manufacturing process. That is, a particular number of product fixtures and work stations necessary to produce a given product are relatively permanently arranged in such machines and are typically only broken down for repair or rebuilding. Clearly, during the period of repair or rebuilding of just a portion of such machine, the entire machine is unavailable for production. Furthermore, because of the unitary, dedicated construction of such machines, the ability to relatively quickly add or remove a certain process or tool fixture to add or delete a certain process step, is generally unavailable.

Hence, it has been found desirable in this general class of machines to have the flexibility of addition and deletion. Specifically, it has been found desirable to provide fixtures for such modules which facilitate not only rapid and accurate mounting of components and assemblies to the assembly machines but also rapid and simplified substitution or replacement of fixtures. The present invention is directed to providing such flexibility in linear assembly machines.

SUMMARY OF THE INVENTION

A mounting fixture for a reconfigurable assembly machine having a plurality of modules with slots formed in their upper surfaces includes a square or rectangular solid block having a plurality of threaded openings. The openings receive fasteners adapted to secure various and diverse assembly machine components and devices to the mounting fixture. One surface of the block includes a channel or keyway having a width equal to the width of the throat of the slots formed in the upper surface of the assembly machine module. A locating key is received in the keyway in the block and the throat of the T-slot. The locating key includes through openings which receive threaded fasteners having heads held captive and the T-slot which, with suitable nuts, secure the block to the upper surface of the module. If desired, the key may be integrally formed in or with the mounting block.

It is therefore an object of the present invention to provide a mounting fixture for a reconfigurable assembly machine.

It is a further object of the present invention to provide a mounting fixture for a reconfigurable assembly machine having a keyway which receives a complementarily configured locating key.

It is a still further object of the present invention having an integrally formed key projecting therefrom.

It is a still further object of the present invention to provide a mounting fixture for a reconfigurable assembly machine having a locating key which is received within complementarily configured channels in the fixture and the module.

It is a still further object of the present invention to provide a mounting fixture for a reconfigurable assembly machine having threaded fasteners extending through a locating key.

Further objects and advantages of the present invention will become apparent by reference to the following description of the preferred embodiment and appended drawings wherein like reference numbers refer to the same element, component or feature.

BRIEF DESCRIPTION OF THE DRAWINGS

FIG. 1 is a perspective view of a reconfigurable assembly machine incorporating the present invention;

FIG. 2 is a fragmentary perspective view of a chain track assembly for a reconfigurable assembly machine incorporating the present invention;

DESCRIPTION OF THE PREFERRED EMBODIMENT

Figure 3:
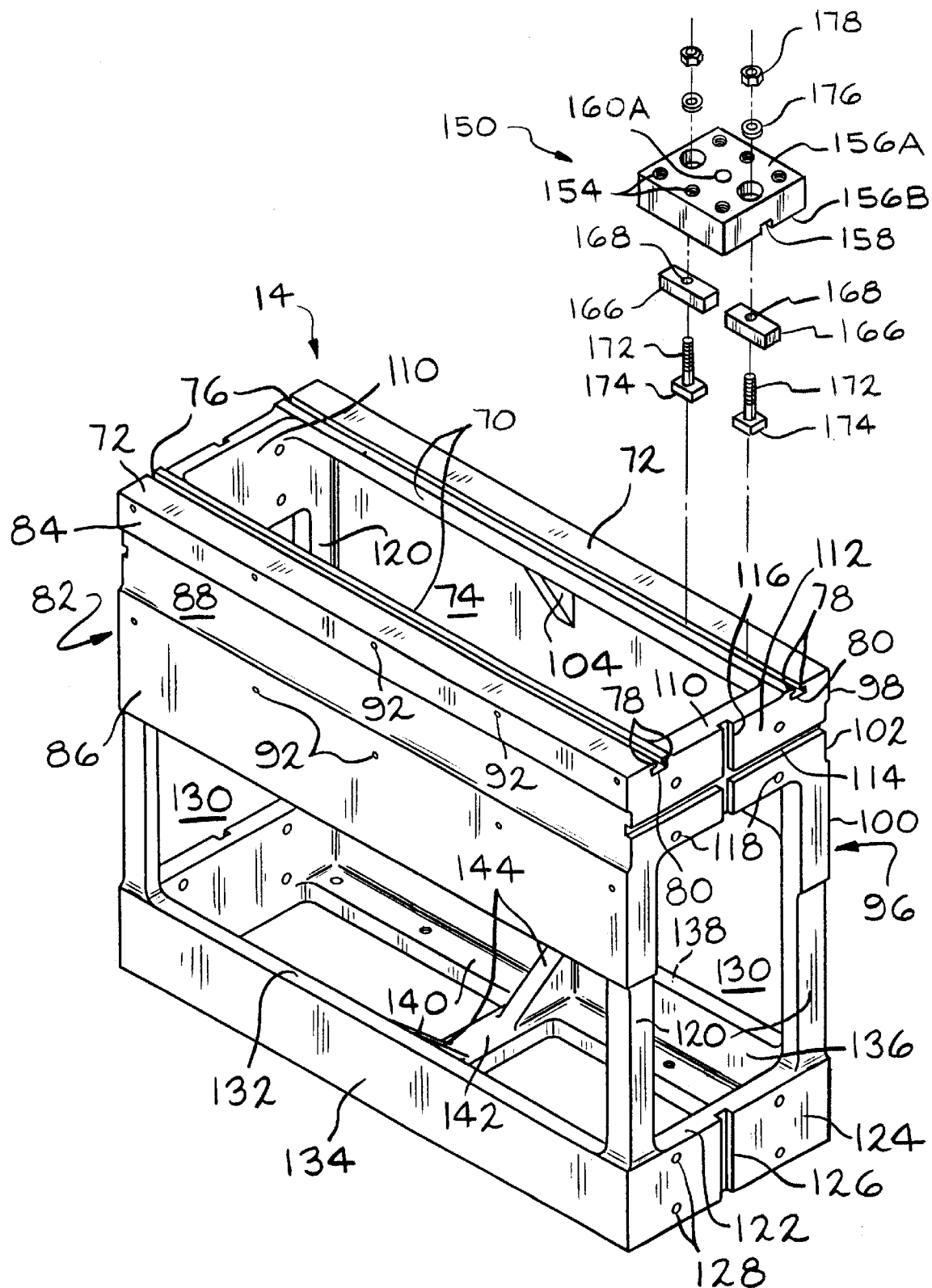
FIG. 3 is an exploded, perspective view of a modular support for a reconfigurable assembly machine having a mounting fixture according to the present invention.

Referring now to FIG. 1, a reconfigurable assembly machine incorporating the present invention is illustrated and generally designated by the reference number 10. If desired, the reconfigurable assembly machine 10 may be disposed upon a rectangular, planar, elongate foundation or mounting plate 12. The optional mounting plate 12 functions as a rigid and dimensionally stable foundation for the assembly machine 10 and may be a suitable material such as hot rolled steel having a width and length at least equal to the corresponding dimensions of the equipment to be placed thereon and preferably somewhat longer and significantly wider.

Juxtaposed along the length of the mounting plate 12 are a plurality of support modules 14. The support modules 14 may be arranged in either a single file configuration or paired in an adjacent, back-to-back configuration as illustrated in FIG. 1. At one end of the plurality of support modules 14 is a drive module 16 which preferably includes an electric motor 18 and an indexing or incrementing gear drive assembly 20. The incrementing gear drive assembly 20 converts the continuous, relatively high speed input from the electric motor 18 to an intermittent, incremental low speed output which drives a chain assembly 22. The chain assembly 22 comprises a plurality of interconnected flat plates or links 24 which circulate in an oval path along the upper portions of the support modules 14. The links 24 are pivotally or hingedly interconnected through the agency of interengaging or interleaved ears 26 and a pivot pin 28 in a structure which generally resembles a hinge. The links 24 preferably include a plurality of threaded apertures 30 arranged in an array which are suitable for the securement of various component and assembly fixtures and the like.

The drive module 16 also drives a shaft 32 which, through a right hand drive assembly 34 and an interconnected output shaft 36 provides rotary drive energy to assemblies disposed on various support modules 14 as will be more fully explained below.

As illustrated in FIG. 2, the links 24 of the chain assembly 22 traverse the side of the support modules 14 in a track assembly 40. The track assembly 40 includes a support plate 42, a lower rail assembly 44 and an inverted, upper rail assembly 46. Both the lower rail assembly 44 and the upper rail assembly 46 are identical but for the fact that one is arranged in an inverted fashion relative to the other. Accordingly, it will be appreciated that both the lower rail assembly 44 and the upper rail assembly 46 include a pair of wider, exterior plates or bars 48 and a narrower, interior bar 50. The interior bars 50 of the lower rail assembly 44 and the upper rail assembly 46 in conjunction with each pair of exterior bars 48 define grooves 52 which slidably receive the links 24 of the chain assembly 22. A plurality of threaded fasteners 54 secure the upper and lower rail assemblies 44 and 46 as well as the support plate 42 to the individual support modules 14.

As illustrated in FIG. 1, the drive module 16 also includes a semi-circular curved track portion 56 which facilitates circulation of the chain assembly 22 from one side of the assembled support modules 14 to the other. Disposed at the opposite end of the assembly machine 10 from the drive module 16 is an idle module 60 which redirects circulation of the chain assembly 22 from one side or face of the assembled support modules 14 to the other. Accordingly, it also includes a semi-circular curved track portion 62 which is in all respects like the curved track portion 56 of the drive module 16.

Turning now FIG. 3, an individual support module 14 is illustrated. The support module 14 is a generally rectangular frame which is preferably first cast and then machined. It should be appreciated at the outset that one of the significant features of the support module 14 is its highly accurate size, i.e., its squareness and surface-to-surface dimensions; and thus its interchangeability or exchangeability with other support modules 14. Hence, both the casting and the finishing undertaken upon the casting which will become the support module 14 must be of the highest dimensional accuracy. The support module 14 is preferably steel but may also be aluminum or other suitable rigid and stable material. As utilized herein, the terms "machined" and "finished" refer generally to any highly accurate process such as milling, grinding or the like which is typically used to achieve a surface with excellent planarity, dimensional accuracy and smoothness. The terms "machined" and "finished" should not, however, be construed to exclude either other currently available manufacturing processes capable of producing surfaces with such characteristics or subsequently developed or perfected manufacturing processes such as powdered metal casting capable of producing a substantially or completely finished and ready to use support module 14 having such characteristics.

As noted, the support module 14 is a rectangular frame or shell having a pair of spaced-apart top sections or panels 70 which are disposed adjacent the front and rear faces of the support module 14. The top sections or panels 70 define a respective pair of co-planar, parallel, spaced-apart machined or finished top surfaces 72 and a generally rectangular open area 74. Disposed adjacent the open area 74 and extending along the full length of the top panels 70 are pair of channels or grooves 76 each defined by a pair of opposed, overhanging flanges or lips 78 which also partially define a wider, undercut region 80. The opposed lips 78 and the undercut region 80 thus define an inverted "T" shape. The undercut region 80 receives fasteners having complementarily sized heads as will be more fully described below.

The upper front portion of the module 14 includes an upper, longitudinal, front section or panel 82 having an upper, front, planar machined or finished surface 84 and an intermediate, front, planar machined or finished surface 86 which are disposed on opposite sides of a recessed surface 88. The front machined surfaces 84 and 86 are co-planar and preferably extend the full length of the support module 14. The upper front panel 82 includes a plurality of threaded apertures 92 which receive the threaded fasteners 54 which secure the rail assemblies 44 and 46 to the support module 14.

The back face of the support module 14 is identically configured and includes an upper, longitudinal, rear section or panel 96 having an upper, rear, planar machined or finished surface 98 and an intermediate, rear, planar machined or finished surface 100 disposed on opposite sides of a recessed surface 102. The rear machined surfaces 98 and 100 are co-planar and preferably extend the full length of the support module 14. The upper rear panel also preferably includes a plurality of threaded apertures 92. The upper front panel 82 and the upper rear panel 96 are strengthened and stabilized by a pair of triangular webs or gussets 104 which extend between each of the top panels 72 and the adjacent upper front panel 82 and the upper rear panel 96. Only the gusset 104 associated with the upper rear panel 96 is illustrated in FIG. 3.

The ends of the support module 14 are also identically configured and thus only the forward end visible in FIG. 3 will be described, it being understood that the rear (hidden) end is configured identically. Each of the upper ends of the support module 14 include an upper, transverse section or panel 110 having an upper, transverse, planar machined or finished surface 112. Formed in the upper transverse panel 110 by any suitable manufacturing or machining process such as cutting, milling or grinding is a first horizontal transverse slot or channel 114 and a vertical, intersecting slot or channel 116 which is preferably disposed precisely in the middle of the transverse panel 110. Also formed in the upper transverse panel 110 are a plurality of through apertures 118.

The vertically medial portion of the support module 14 is defined by four vertically oriented stanchions or posts 120 disposed generally in the vertical corners of the support module 14 which connect the upper sections 82, 96 and 110 with corresponding lower sections. The lower ends of the support module 14 include lower, transverse sections or panels 122 having lower, transverse, planar, machined or finished surfaces 124 which are co-planar with the upper, transverse machined surfaces 112 of the upper transverse panels 110. Disposed at the transverse mid-point of each of the transverse panels 122 is a vertical slot or channel 126 which is preferably aligned with the vertical channel 116 formed in the upper transverse panels 110. An array or plurality of through apertures 128 are also formed in the lower transverse panels 122. The upper transverse panels 110, the posts 120 and the lower transverse panels 122 define generally rectangular openings 130 in the ends of the support module 14. It should be understood that the upper, transverse machined surfaces 112 and the lower, transverse machined surfaces 124 at each end of the support module 14 are co-planar and that such planes are parallel to one another.

The lower region of the support module 14 also includes a lower, front section or panel 132 having a lower, front, planar machined or finished surface 134 which is co-planar with the upper, front machined surfaces 84 and 86. The lower front panel 132 preferably extends the full length of the support module 14. A complementarily configured lower rear section or panel 136 includes a lower, rear, planar machined or finished surface 138 which is co-planar with the upper rear machined surfaces 98 and 100. The lower rear section or panel 136 likewise preferably extends the full length of the support module 14. It should also be understood that the plane defined by or containing the front, planar machined surfaces 84, 86 and 134 and the plane defined by or containing the rear, planar machined surfaces 98, 100 and 138 are parallel. It should be understood that the front machined surfaces 84, 86 and 134 and the rear machined surfaces are perpendicular to the top machined surfaces 72 and the transverse machined surfaces 112 and 134.

Finally, the support module 14 includes a pair of longitudinally extending bottom sections or panels 140 (one of which is illustrated in FIG. 3) with merge with the adjacent front, lower panel 132 or rear, lower panel 136 and preferably extend longitudinally the full length of the support module 14. The bottom panels 140 are joined in the middle by a transverse beam 142. A pair of triangular webs or gussets 144 extend from the bottom panels 140 and the transverse beam 142 to a respective one of the lower panels 132 and 136. A plurality of threaded fasteners (not illustrated) extend through the bottom panels 140 and are received within complementarily threaded openings in the mounting plate 12 to secure the support modules 14 thereto. Other details of the support module 14 relating to its disposition on the mounting plate 12 may be found in my U.S. Pat. No. 5,904,242, granted May 18, 1999 which is hereby incorporated by reference.

Figure 4:
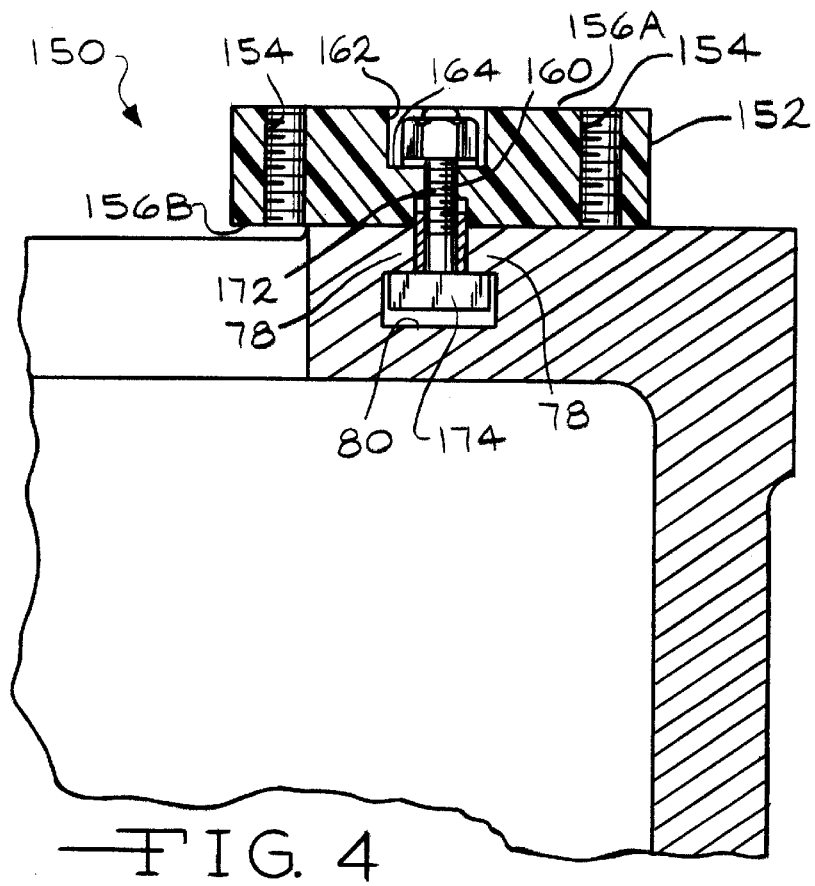
FIG. 4 is a fragmentary, sectional view of a mounting fixture according to the present invention secured to a modular support of a reconfigurable assembly machine.

Turning now to FIGS. 3 and 4, a mounting fixture assembly 150 according to the present invention is illustrated. The mounting fixture assembly 150 includes a square or rectangular, preferably solid, mounting block 152 having a width about equal to the width of the top sections or panels 70 of the support module 14 and a length of an equal or greater distance. The mounting block may be about 5 inches (12.7) by 5 inches (12.7 cm) by 1.25 inches (3.18 cm) or larger or smaller if desired. The mounting block 152 includes a plurality of threaded apertures such as tapped openings 154 aligned in rows and columns as illustrated in FIG. 3. The tapped openings are utilized with suitable bolts to secure components such as tooling and testing devices to the mounting block 152 as will be described below. In a mounting block 152 having a width and length of about five inches (12.7 cm), two rows of three tapped openings 154 have been found suitable. For each approximately two inch (5.1 cm) increase in length, it has been found appropriate to add an additional tapped opening 154 in each row. Preferably, the threads in the tapped openings 154 are ½"-13 threads although larger or smaller apertures and finer or coarser threads may be preferable in certain applications. While described as tapped openings 154, it will be appreciated that the threads of such tapped openings 154 may be formed by any known process including, for example, in-situ casting if the mounting block 152 is made of a material permitting it.

The mounting block 152 itself is preferably a high strength polymer such as ABS or fiberglass reinforced plastic, cast urethane (70 durometer or greater) and may be also made of steel or aluminum. The mounting block 152 includes accurately parallel upper and lower faces or surfaces 156A and 156B, respectively. A keyway 158 is disposed along a reference centerline in the lower surface 156B. The keyway 158 preferably defines a width exactly equal to the width of the channels or grooves 76 defined by the overhanging flanges or lips 78. Dimensionally, the keyway 158 is preferably at least three-quarters of an inch (1.90 cm) and may readily be larger or smaller if desired. Aligned with the keyway 158 are a pair of through passageways 160 suitable for receiving fasteners. Intermediate the pair of through passageways 160 is a through aperture 160A having a diameter equal to the width of the keyway 158. The through passageways 160 include enlarged regions 162 defining shoulders 164.

As noted, the top panel 70 of the support module 14 includes slots or channels 76 defined by a pair of opposed, overhanging flanges or lips 78. The flanges or lips 78 are spaced apart a width just slightly larger than the width of the keyway 158. Received within the keyway 158 and disposed between the flanges or lips 78 is one or a pair of locating keys 166. The key or keys 166 are preferably made of a metal such as steel or aluminum. The locating key or keys 166 include through passageways or apertures 168 which align with or may be aligned with the passageways 160 in the mounting block 152. The passageways 168 in the key or keys 166 receive threaded fasteners such as bolts 172 having enlarged, preferably square heads 174. The bolts 172 are preferably ⅝"-11 but may be larger or smaller and have finer or coarser threads if desired. The threaded fasteners or bolts 172 extend through the passageways or apertures 168 in the locating key or keys 166, through the passageways 160 in the mounting block 152 and receive washers 176 and nuts 178. Preferably, the length of the bolts 172 and thickness of the washers 176 and the nuts 178 are such that they are fully recessed in the enlarged regions 162 of the mounting block 152 and do not protrude beyond its upper surface 156A.

So assembled, as illustrated in FIG. 4, the nuts 178 may be loosened which is readily accomplished inasmuch as the heads 174 of the bolts 172 are sufficiently large that the bolts 172 are inhibited from rotating within the undercut region 80 and sufficiently small that the bolts 172 may slide along them. Thus, if the nuts 178 are loosened, the mounting block 152 as well as other associated components may be readily slid along the slots 76. The locating key or keys 166 very accurately maintains the position of the mounting block 152 in a direction transverse to the slot 76. The nuts 178 may be readily tightened when the mounting block 152 is positioned at a desired location along the length of the slot 76.

Preferably, the height of the keyway 156 and the height of the channels or grooves 76 defined by the thickness of the flanges or lips 78 are greater than the height of the locating key or keys 166, as illustrated in FIG. 4, so that no vertical compressive force is exerted on the key or keys 166 when the nuts 178 are tightened. So configured, only the lower surface 156B of the mounting block 152 and the upper surface 72 of the top panel 70 vertically locate or position the mounting block 152. That is, the locating key or keys 166 preferably contribute nothing to vertically locating the mounting block 52. The locating key or keys 166, of course, do highly accurately transversely locate the mounting block 152 on the surface 72 of the top panel or section 70.

Figure 5:
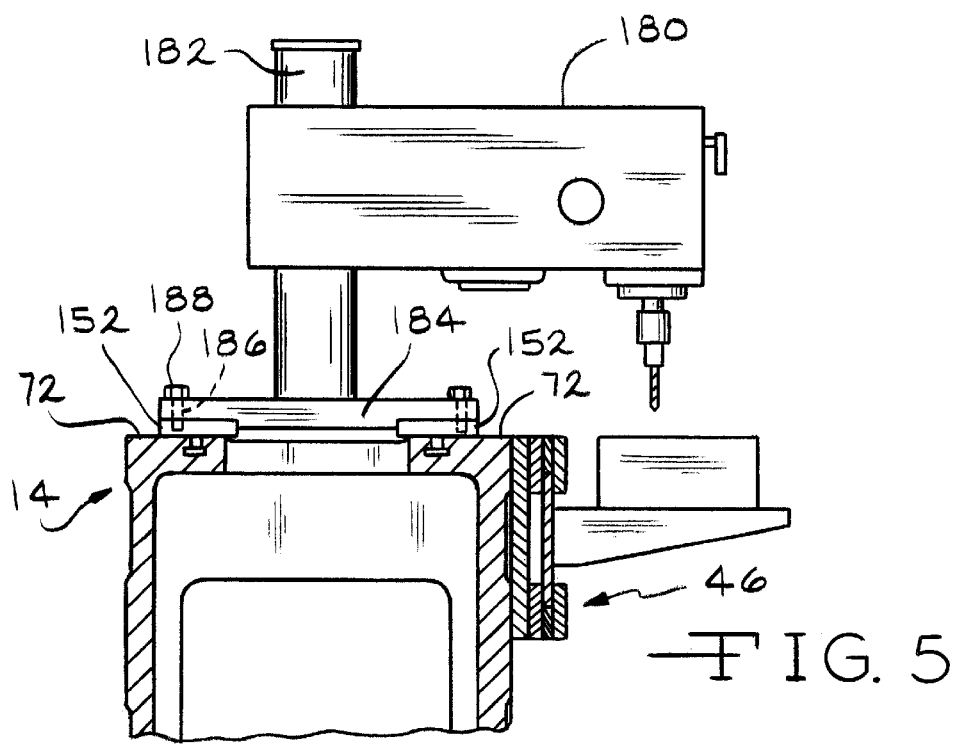
FIG. 5 is a fragmentary, side, elevational view of a drill press attached by mounting fixtures according to the present invention to a reconfigurable assembly machine.
Figure 6:
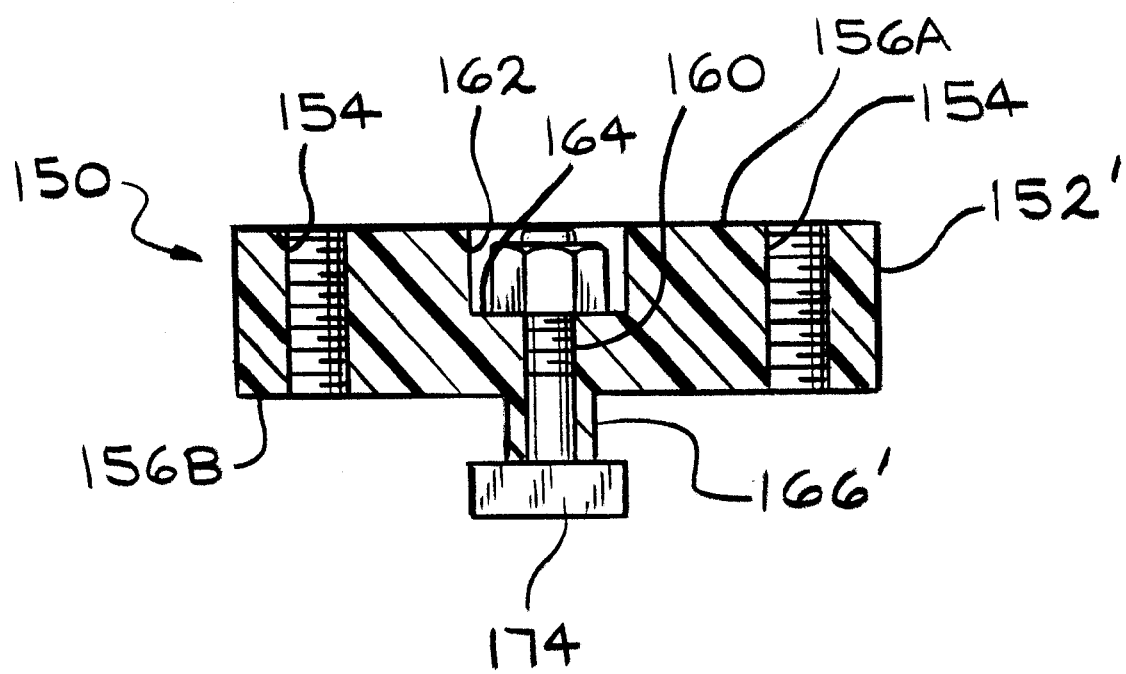
FIG. 6 is a fragmentary, sectional view of a mounting fixture according to the present invention showing a key integrally formed in the mounting block.

The mounting blocks 152 may be utilized singly or, as illustrated in FIG. 5, they may be utilized in pairs. The mounting blocks 152 may also be utilized in multiple groups, typically as multiple pairs. In FIG. 5, a drill press 180 includes a mounting stanchion 182 which is secured to a horizontal mounting plate 184. It should be appreciated that the drill press 180 illustrated is presented by way of example and illustration only and that the mounting blocks 152 according to the present invention may be and are intended to be utilized with myriad component supply, assembly and testing units and stations of every style and type. The horizontal mounting plate 184 includes a plurality of apertures 186 which receive threaded fasteners 188 having threads complementary to the threads in the tapped openings 154. Thus, the drill press assembly 180 may be readily disposed and supported upon a pair of the mounting blocks 152 and accurately and tightly secured thereto by use of the threaded fasteners 188.

It will be appreciated that the upper surface 156A and the lower surface 156B of the mounting block 152 are both accurately parallel to one another and smoothly finished whereby disposition of the mounting block 152 as illustrated in FIG. 4 on the top surface 72 of the panel or section 70 of the support module 14 results in the upper surface 156A of the mounting block 152 being also accurately parallel to the top surface 72 of the panel or section 70. Likewise, the tapped openings 154 are highly accurately perpendicular to the top surface 72 of the panel or section 72. Hence, the mounting fixture assembly 150 of the present invention provides an adjustable though accurately and securely positionable fixture for mounting supply, assembly and testing components to bases or modules 14 of assembly machines 10 which maintain the orthogonal relationship, i.e., the parallelism and perpendicularity, of the attachments secured to the bases or modules 14.

It should be appreciated that the present invention also comprehends a configuration of a mounting fixture assembly 150 wherein a mounting block 152' has a formed or machined key 166' extending from its lower surface 156B and includes at least one through passageway 168, i.e., a mounting block 152' wherein the key 166' is integrally formed with, rather than separate from and assemblable to, the mounting block 152'.

The foregoing disclosure is the best mode devised by the inventor for practicing this invention. It is apparent, however, that apparatus incorporating modifications and variations will be obvious to one skilled in the art of accessories and components for assembly machines. Inasmuch as the foregoing disclosure presents the best mode contemplated by the inventor for carrying out the invention and is intended to enable any person skilled in the pertinent art to practice this invention, it should not be construed to be limited thereby but should be construed to include such aforementioned obvious variations and be limited only by the spirit and scope of the following claims.

I claim:

1. A mounting fixture for an assembly machine module comprising, in combination,
   at least one mounting block including parallel upper and lower surfaces, defining a keyway, at least one threaded opening and at least one through passageway aligned with said keyway,
   a key having at least one through opening, and
   a threaded fastener extending through said one through opening in said key and said at least one through passageway in said mounting block and a head capable of inhibiting rotation of said threaded fastener.

2. The mounting fixture of claim 1 wherein said threaded fastener includes a square head.

3. The mounting fixture of claim 1 further including an assembly machine module having a slot defined by opposed, overhanging flanges.

4. The mounting fixture of claim 3 wherein said threaded fastener includes a head configured to slide but not rotate in said slot.

5. The mounting fixture of claim 1 wherein said at least one mounting block includes at least six threaded openings.

6. The mounting fixture of claim 1 wherein said mounting fixture includes at least two mounting blocks utilized in pairs to mount an assembly or testing device.

7. The mounting fixture of claim 1, wherein said parallel upper and lower surfaces are flat.

8. The mounting fixture of claim 1, wherein said key is separable from said mounting block.

9. The mounting fixture of claim 1, wherein at least one through passageway in said mounting block includes a counterbore adapted to receive a nut.

10. A mounting fixture for an assembly machine module having a slot defined by opposed, overhanging flanges comprising, in combination,
    a mounting block having parallel upper and lower surfaces, defining a projecting key, at least one threaded opening and at least one through passageway in said key, and
    a threaded fastener extending through said one through passageway in said key and a head that inhibits rotation of said threaded fastener when disposed in the slot of the assembly machine module.

11. The mounting fixture of claim 10 wherein said threaded fastener includes a square head.

12. The mounting fixture of claim 10 wherein said mounting block includes at least six threaded openings.

13. The mounting fixture of claim 10 wherein said mounting block is utilized in pairs to mount an assembly or testing device.

14. The mounting fixture of claim 10 wherein said key is integrally formed with said mounting block.

15. The mounting fixture of claim 10 wherein said key and said mounting block are separable components.

16. A mounting fixture for an assembly machine module comprising, in combination,
    a mounting block having first and second parallel, planar surfaces, a keyway adjacent said first planar surface, at least one through opening extending from said keyway to said second surface, at least one threaded passageway extending from said second surface toward said first surface,
    a key extending from said keyway and including a through passageway aligned with said at least one through opening, and
    a fastener extending through said through passageway and said at least one through opening and including a head portion defining a shape engageable by a machine element having a surface complementary to at least a portion of said shape.

17. The mounting fixture of claim 16 further including a frame having a surface, a slot in said surface adapted to receive said key and an enlarged region adjacent said slot adapted to receive said head portion and inhibit rotation thereof.

18. The mounting fixture of claim 16 wherein said shape of said head portion is square.

19. The mounting fixture of claim 16 wherein said mounting block includes at least six threaded passageways.

20. The mounting fixture of claim 16 wherein said mounting block is utilized in pairs to mount an assembly or testing device.

* * * * *